United States Patent [19]

Asada et al.

[11] Patent Number: 4,468,754

[45] Date of Patent: Aug. 28, 1984

[54] ELECTRONIC TRANSLATOR FOR SELECTING CURSOR POSITION TO INPUT NEW WORDS

[75] Inventors: Atsushi Asada; Hisao Morinaga; Mitsuhiro Saiji, all of Nara, Japan

[73] Assignee: Sharp Kabushiki Kaisha, Osaka, Japan

[21] Appl. No.: 307,112

[22] Filed: Sep. 30, 1981

[30] Foreign Application Priority Data

Sep. 30, 1980 [JP] Japan ................... 55-137177

[51] Int. Cl.³ ............................................. G06F 15/38
[52] U.S. Cl. ........................................ 364/900; 364/419
[58] Field of Search ............... 364/419, 900 MS File; 340/709

[56] References Cited

U.S. PATENT DOCUMENTS

| 3,974,493 | 8/1976 | De Cavaignae et al. | 340/709 |
| 4,373,192 | 2/1983 | Yanagiuchi et al. | 364/900 |
| 4,381,551 | 4/1983 | Kanou et al. | 364/900 |
| 4,393,460 | 7/1983 | Masuzawa et al. | 364/900 |

FOREIGN PATENT DOCUMENTS 2014765 8/1979 United Kingdom ............... 364/900

Primary Examiner—Charles E. Atkinson
Assistant Examiner—Michael R. Fleming
Attorney, Agent, or Firm—Birch, Stewart, Kolasch & Birch

[57] ABSTRACT

An electronic translator operates to replace an old word or words in a sentence with a new word or words so as to make from an old sentence a new sentence. A cursor selector is provided for passing over part of the old word or words, such part being common to the old and new sentences. Another word or words may be altered or replaced by new words.

10 Claims, 5 Drawing Figures

ELECTRONIC TRANSLATOR FOR SELECTING CURSOR POSITION TO INPUT NEW WORDS

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional types of electronic devices in that the former is of a unique structure which provides for efficient and rapid retrieval of word information stored in a memory.

An example of a specific electronic translator for replacing one or more words in a stored sentence with new word or words to re-form a different sentence is disclosed in a copending U.S. patent application Ser. No. 339,727 filed Jan. 15, 1982, which is a continuation of No. 117,003 filed on Jan. 30, 1980 by K. Yoshida, commonly assigned to the present assignee. It is now expected that much more simplified operation in a shorter time is possible to replace the old word data with the new word data. The disclosure of Ser. No. 339,727 is incorporated herein by reference.

SUMMARY OF THE INVENTION

Accordingly, it is an object of the present invention to provide an improved electronic translator having means for selecting a cursor position to input at least one new word in place of an old word.

It is another object of the present invention to provide an improved electronic translator wherein a cursor can pass some letters or words to be replaced, inputting new word or words to replace other old word or words.

It is a further object of the present invention to provide an improved electronic translator wherein a cursor can pass at least one word among old words to be replaced, inputting new words to replace others of the old words.

Briefly described, in accordance with the present invention, an electronic translator operates to replace an old word or words in a sentence with a new word or words so as to make from an old sentence a new sentence. A cursor selector is provided for passing part of the old word or words, the part being in common with part of the new sentence. Replacing the old word or words with the new word or words is carried out after passing the common part of the sentences.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

First of all, any kind of language can be applied to an electronic translator of the present invention. An input word is spelled in a specific language to obtain an equivalent word, or a translated word spelled in a different language corresponding thereto. The languages can be freely selected.

Figure 1:
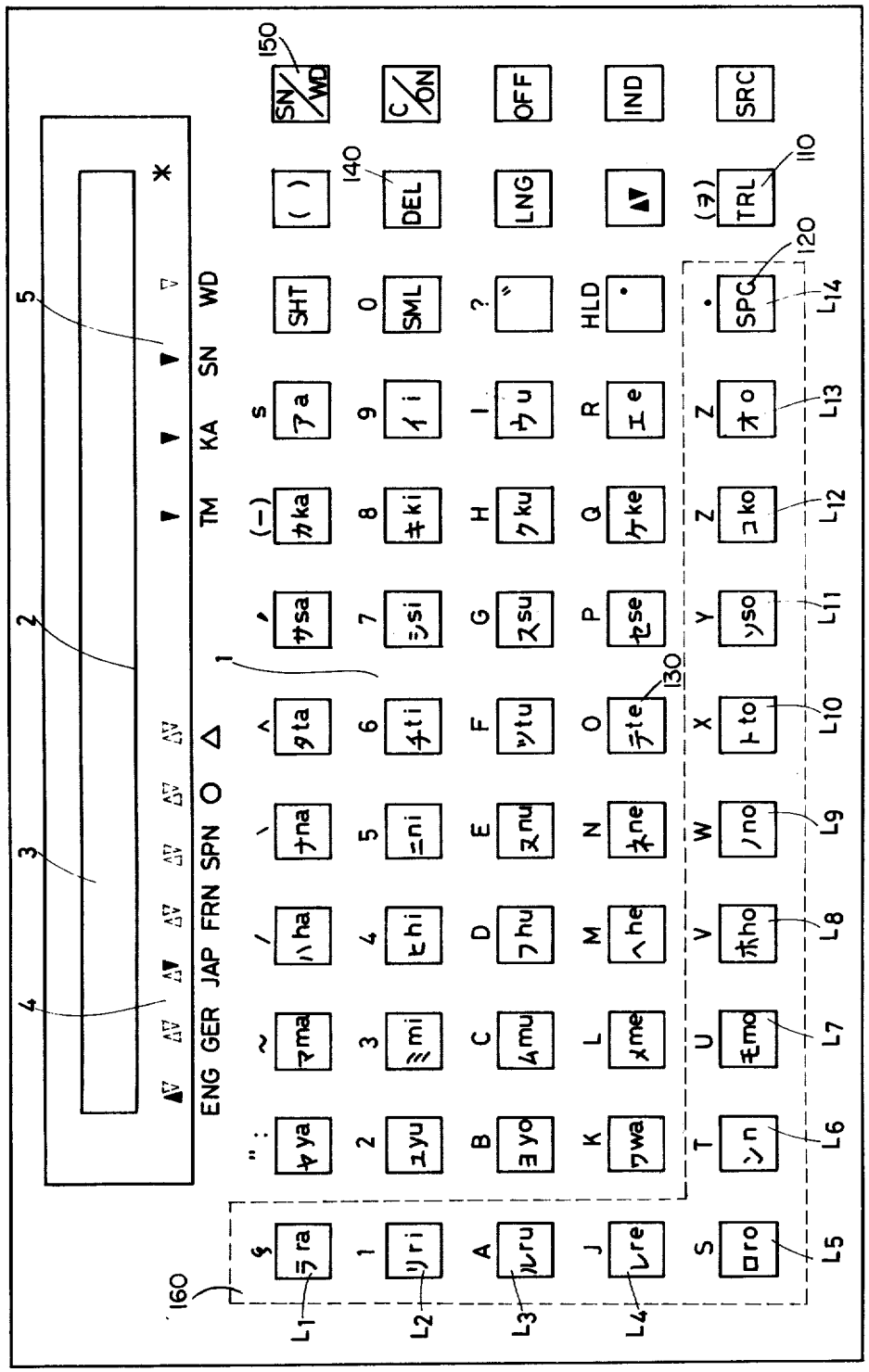
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator or display 3, a kind of language or tongue indicator 4 and a symbol indicator 5.

The character display 3 shows characters processed by this translator. The kind of tongue or language indicator 4 shows symbols used for indicating the mother tongue and the foreign tongue processed by the translator. The symbol indicator 5 shows symbols used for indicating operating conditions in this translator.

Figure 2:
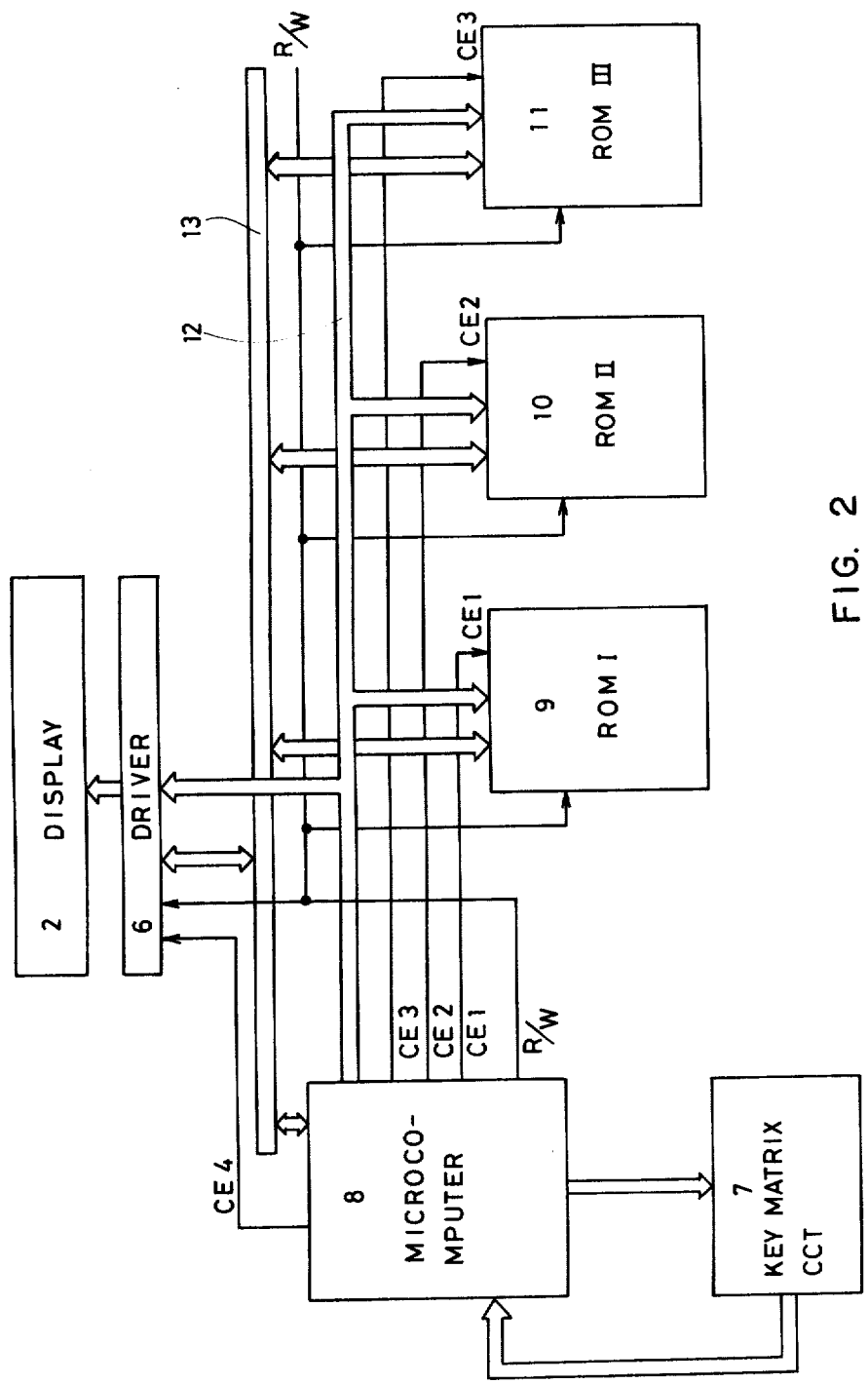
FIGS. 2 and 3 show block diagrams of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions with the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferable example of the present invention, each of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator. However, each of the ROM II 10 and the ROM III 11 can be removed from the translator and replaced by another type of ROM as a module.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMS 9 to 11. Words and/or sentences are provided to the microcomputer 8 from the selected ROM. $CE_4$ indicates a chip selection signal for the driver 6. R/W indicates a read/write signal for selecting read or write operation.

Figure 3:
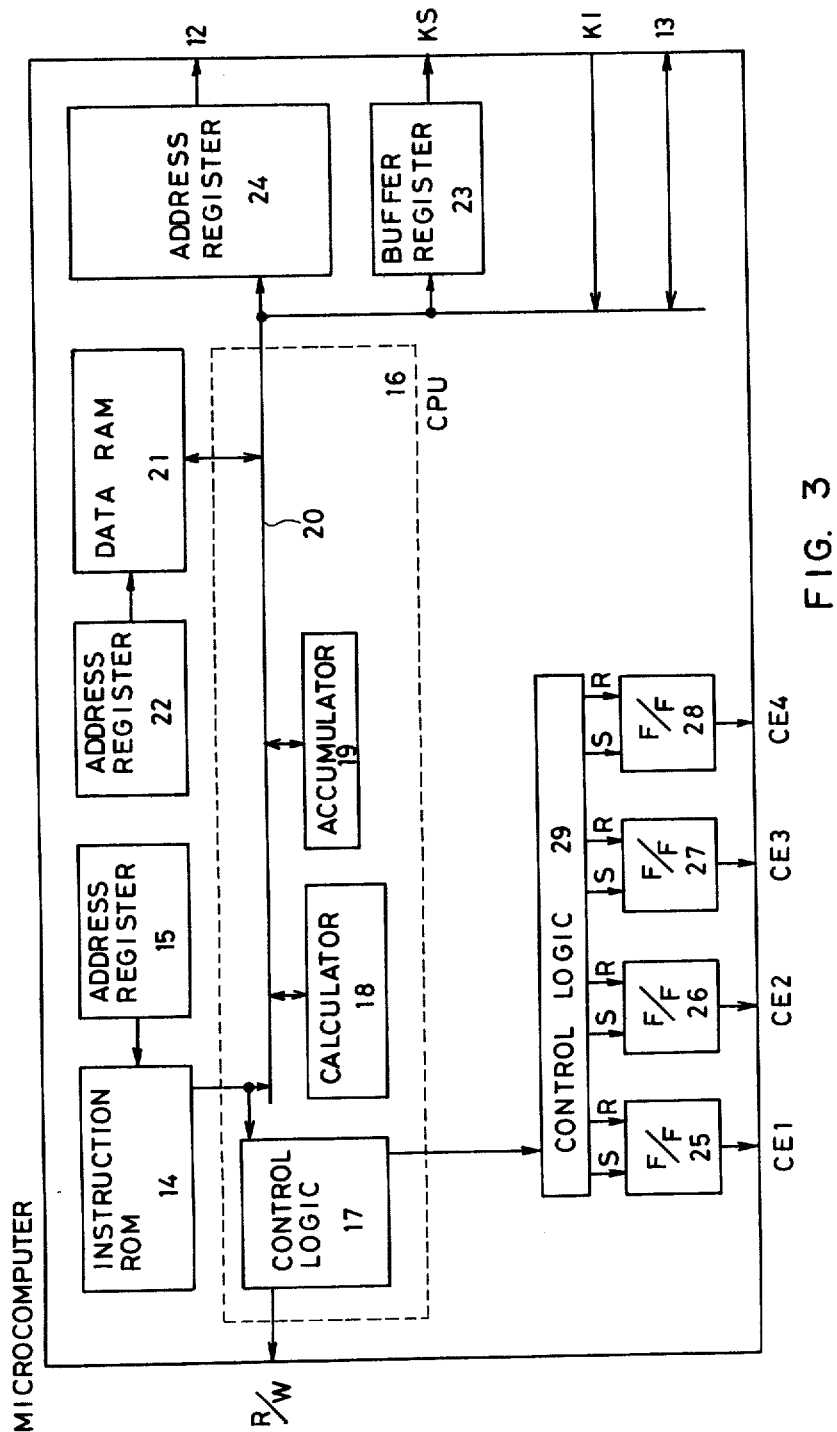

FIG. 3 shows a block diagram of the microcomputer 8 of FIG. 2. An instruction ROM 14 stores a number of kinds of instructions each of which is used for a specific operation by the translator and is, preferably, in coded format. As the address of a ROM address register 15 is in turn advanced, the ROM 14 provides a specific kind of instruction. The specific instruction is applied to a CPU 16 and CPU 16 responds by providing its selected operation.

The CPU 16 comprises a control logic 17, a logic calculator 18, and an accumulator 19. An inner data bus is indicated by numeral 20. Date RAM 21 is provided for preliminarily containing data used for the translator and for functioning as a conditional flip flop used for a branch in a program operation. Data from the CPU 16 are stored in a specific location of the data RAM 21 which is selected by a RAM address register 22. The data stored in such a location of the RAM 21 are developed to the CPU 16.

Numeral 23 represents an output buffer register for outputting key strobe signals KS provided to the key matrix circuit 7 so that the output of this circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to select, increment or decrement an address is carried out by the CPU 16. Since the CPU 16 is coupled to the data bus 13 as shown in FIG. 3, transmission of the data between the CPU 16 and the external memory is via the data bus 13. Direction of transmission of the data between them is defined with the read write signal R/W.

Each of flip flop circuits 25 to 28 is set or reset by a control logic 29. The control logic 29 is controlled by the CPU 16. The outputs of flip flops 25 to 28 are chip selection signals $CE_1$ to $CE_4$, respectively.

Figure 4:
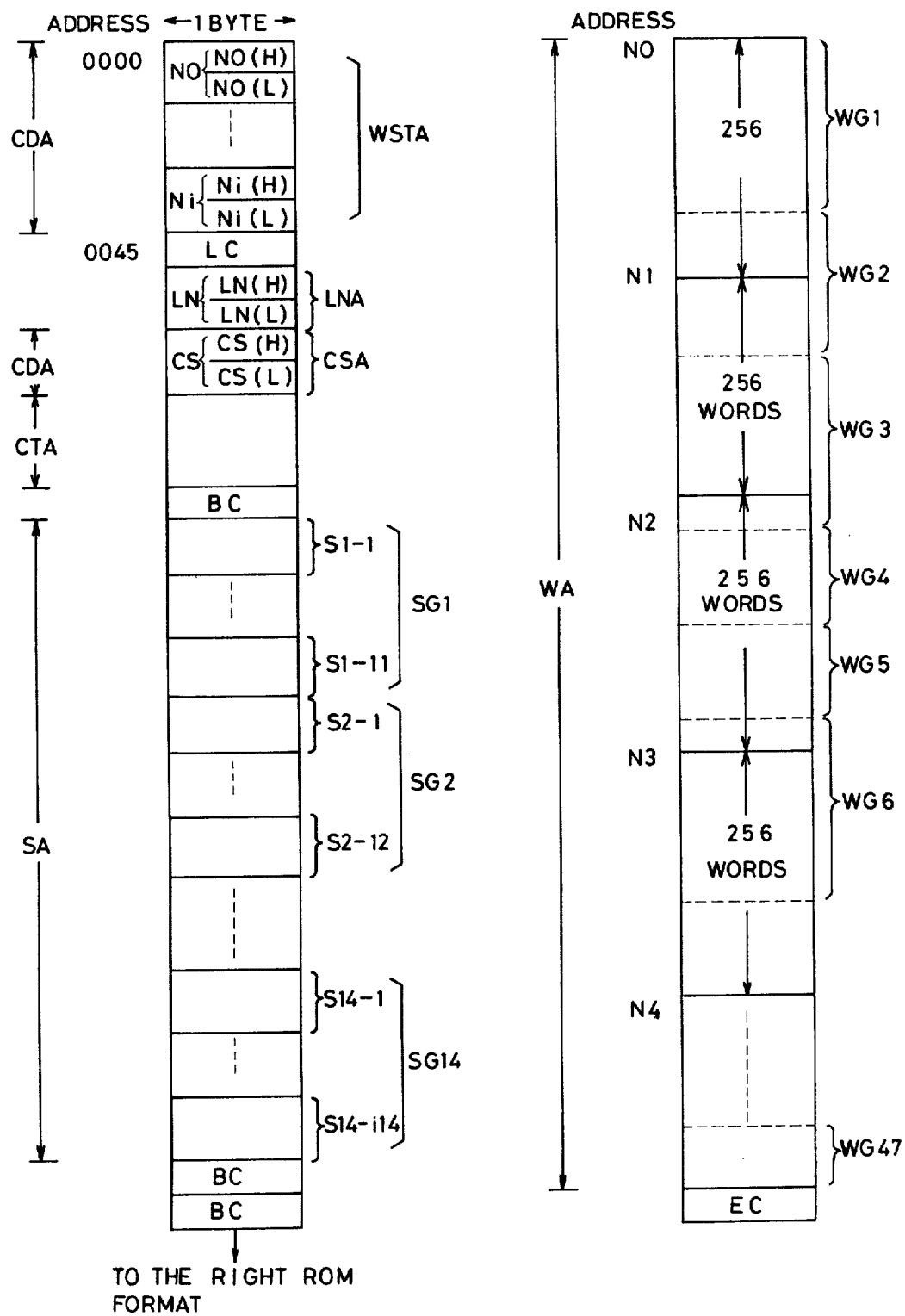
FIG. 4 shows a format of a ROM for memorizing words, the ROM being connected in the circuit of FIG. 2.

FIG. 4 shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of letters "AN" is stored as a compressed code of 1 byte, $CC_1$. Another pair of letters "BA" is stored as a compressed code of 1 byte, $CC_2$. Frequency of occurrence of spelling of English words is determined to detect English spellings having high frequency of occurrence. Such English spellings are changed to corresponding compression codes for memorizing purposes. The data-compression table CTA stores data representing correspondence between the selected spellings and the compression codes.

When correspondence between an input word and words memorized in one of the ROMs is to be detected, the input word is changed to codes inclusive of one of the compression codes according to the contents of the data-compression table CTA since each of the ROMs stores codes which may include one of the compression codes. The table CTA is used to construct words stored in one of the ROMs by changing the codes to the original spelling. The nature of this table depends on the kind of language and should maximize the degree of data compression.

Stored words are classified as 47 categories in each of which a number of words are ordered. In FIG. 4, a word category n is referred to WGn. Sentences are formed by a combination of a plurality of stored words. These sentences are classified as 14 categories in each of which a number of sentences are ordered. In FIG. 4, a sentence category m is referred to SGm containing a first sentence $S_{m-1}$ to a last sentence $S_{m-im}$. Each of the word categories WG1 to WG4 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "ç" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amuzement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words contains 256 words. A first word address table region WSTA contains a first address for each referred to as $N_0, N_1, N_2, \ldots N_4$ in FIG. 4. This first address is related to a location in which first codes or first compressed code for representing the first word is stored. In accordance with a specific example of the present invention, each address is represented with two bytes. Each first address is separated to an upper byte referred to No(H) to Ni(H) and a lower byte referred to No(L) to Ni(L). The first word address table region is used to shorten retrieval time for a specific word.

CS is a first sentence address CS(H) and CS(L) which is stored in a first sentence address region CSA. LNA indicates a memory location for storing a serial number of a word indicating the kind of language referred to as LN including LN(H) and LN(L). More particularly, as the ROM storing English words is concerned, a word "English" is necessarily contained in that ROM. In such a case, the serial number of the word "English" in the ROM is LN starting from the first word of the group. Memorizing the serial number LN is suitable for showing the kind of the mother tongue and the foreign tongue being selected in the character indicator 3. It is unnecessary to additionally memorize a word showing the kind of tongue.

The translator of the present invention may comprise audible sound generating means for developing words represented in the mother tongue and/or the foreign tongue. Since such an audible sound genrating means is disclosed in, for example, Hyatt U.S. Pat. No. 4,060,848 issued Nov. 29, 1979, further description is omitted.

In FIG. 4, LC indicates a tongue code in which the upper 4 bits indicate a field of language stored in the ROM and the lower 4 bits the kind of language stored in the ROM. In particular, there may be present a ROM for storing words oriented to economy, engineering or medicine, respectively. Information representing such a field is stored in LC. The lower 4 bits correspond to each kind of tongue as follows:

TABLE 1-2

| The lower 4 bits | the kind of language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "O" |
| 0 1 1 1 (7) | a further tongue "▲" |

In FIG. 4, BC, "11111111" is a boundary code and EC "11111111" is an end code of the ROM.

Figure 5:
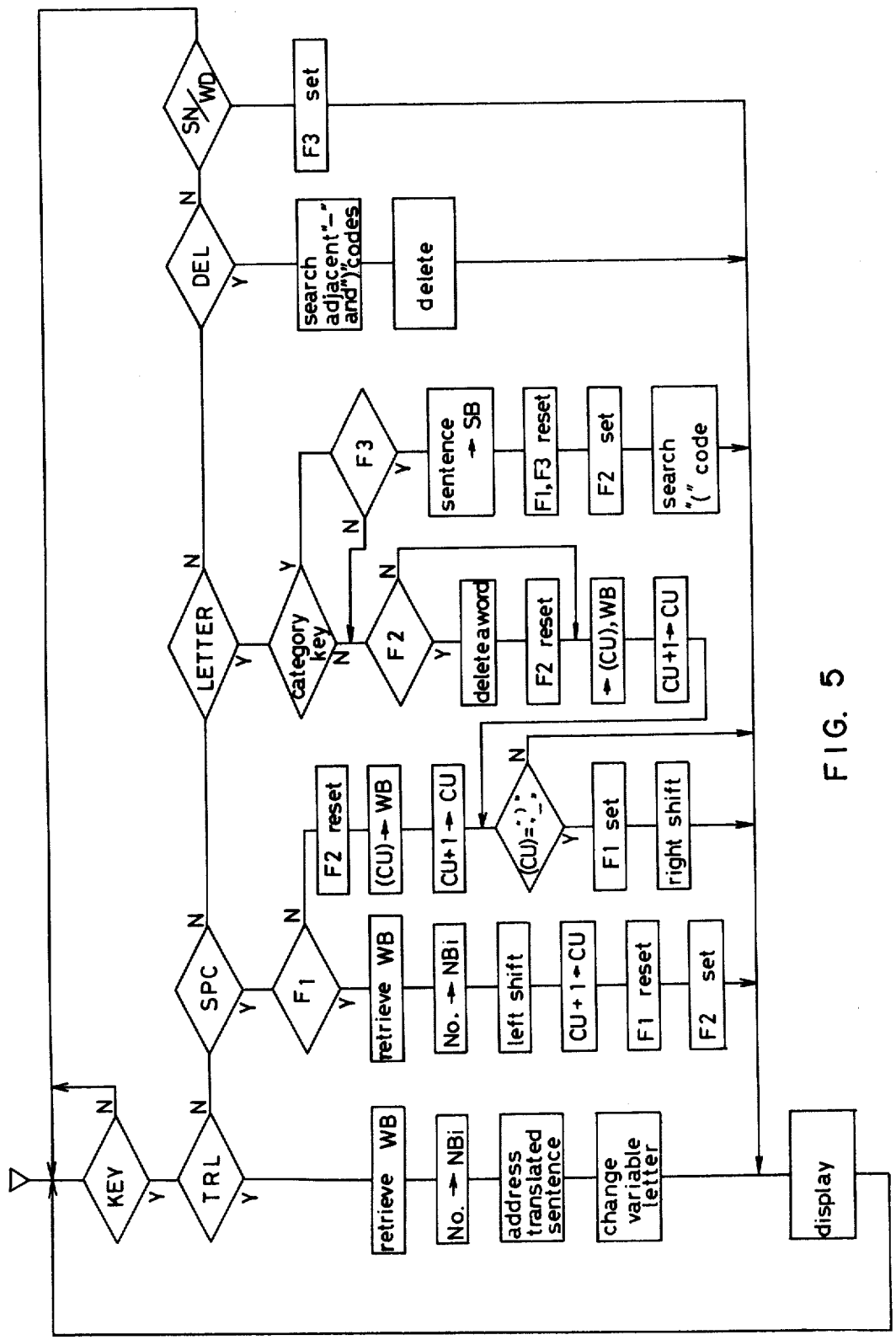
FIG. 5 shows a flow chart of operation of the translator according to the present invention.

FIG. 5 shows a flow chart indicating operation of the electronic translator according to the present invention. A feature of the translator operation is that a cursor can pass some letters or words which are to form part of a new word or words, and replace some word or words. In other words, a cursor can pass at least one word contained in the original words which is also to be contained within the new words. The cursor shows the operator where he is in a sentence. It can move across the display.

With reference to FIG. 5, the control circuit detects whether any one of key switches is actuated. If any one of them is actuated, the circuit which of translation key 110, a space key 120, one of the letter keys 130, a delete key 140, or a sentence/word key 150 all contained in FIG. 1 is actuated. When none of these keys is actuated, the control circuit is adapted to detect the following key input operation.

The sentence/word key 150 is actuated for selecting the sentence selection mark "SN" or the word selection mark "WD" in FIG. 1. Actuating the sentence/word key 150 sets a flag F3.

Flags $F_1$ through $F_3$ indicate respective conditions, being constructed as part of the data RAM 21 in FIG. 3. By setting the flag $F_3$, either of the marks "SN" and "WD" is illuminated. The control circuit is adapted to detect the following key actuation.

The delete key 140 is actuated to search a blank "-" and a closing half ")" of parentheses which are nearest to the present cursor position of the sentence. All the letters before the located blank "-" and half of parentheses are deleted, whereby the sentence is displayed. The following key actuation is to be detected.

One of the letter keys 130 is actuated to detect whether one of the category keys 160 is actuated and the flag $F_3$ is set. When a category key is actuated, the control circuit reads out a sentence with one or more changeable words in a mother language from the corresponding sentence data region SA of the word ROM so that the sentence is entered to a sentence buffer SB. The flag $F_1$ is set to indicate that the present cursor position is at the blank "-" or the closing half of parentheses.

The flags $F_1$ and $F_3$ are reset. The flag $F_2$ is set to indicate that the present cursor position is at the heading of any word. An opening half of parentheses is located in the sentence buffer SB. The mother language sentence is displayed. The following key actuation is to be detected.

When the actuation of one of the category keys 160 and the setting of the flag $F_3$ are not detected, it is detected whether the flag $F_2$ is set. When the flag $F_2$ is set, all the letters forming a word, before the blank "-" or the closing half ")" of parentheses which are nearest to the present cursor position, are deleted to thereby reset the flag $F_2$. Letter codes corresponding to actuated keys are entered to the present cursor position of the sentence buffer SB and the word buffer WB. A digit of 1 is added to the contents of a cursor pointer CU. It is detected whether the pointer CU for containing the present cursor position in the sentence buffer SB contains the blank code or the closing half of parentheses. If either is detected, the flag $F_1$ is set. Data following the cursor position are right shifted. The present sentence is displayed. The following key actuation is to be detected.

As long as the flag $F_2$ is reset, there is no deleting of any letters. The actuated letter codes are entered to the cursor position in the sentence buffer SB and the word buffer WB. When the pointer CU does not contain the blank and the closing half of parentheses, the flag $F_1$ is not set and the right shifting is not carried out, and the sentence is displayed.

When the space key 120 for spacing words is actuated, it is detected whether the flag $F_1$ is set. If it is not set, the flag $F_2$ is reset. The contents of the pointer CU are entered to the word buffer WB. The pointer CU is incremented by one. It is detected whether the pointer CU contains the blank or the closing half of parentheses. Depending on the result, the flag $F_1$ may be set or the data after the cursor position may be right shifted. The sentence is displayed. The following key operation is to be detected.

When the flag $F_1$ is set, the word ROM is searched to find data corresponding to the contents of the word buffer WB. The word serial number is applied to the i-th serial number buffer $NB_i$. Data for the word after the cursor position is left shifted. The pointer CU is advanced by one.

The flag $F_1$ is reset and the flag $F_2$ is set. The sentence is displayed. The following key operation is to detected.

When the translation key 110 is actuated, the contents of word buffer WB is retrieved to find the last-entered word. The word serial number is applied to the serial number buffer NBi. The word ROM is adapted to output a foreign language sentence with one or more changeable words. The word ROM is further adapted to develop a word having the serial number which is stored in the serial number buffer NBi. The thus derived word is substituted for the changeable word or words so as to replace the changeable word or words in the translated sentence. The thus-modified translated sentence is displayed. The following key operation is to be detected.

Some examples are as follows:

EXAMPLE 1

A first mother language (Japanese) sentence:
"(アノ アカイ ホン) ヲ クダ " サイ."
which can be translated to English to read "GIVE ME (THAT RED BOOK)." which is stored in the memory.

TABLE 1

| Step | Key Operation | Display |
|---|---|---|
| 1 | SN/WD and one category key | (アノ アカイ ホン) ヲ クダ"サイ. |
| 2 |  | (ア゜ アカイ ホン) ヲ クダ"サイ. |
| 3 | SPC | (ア゜ アカイ ホン) ヲ クダ"サイ. |
| 4 | SPC | (ア゜ アカイ ホン) ヲ クダ"サイ. |
| 5 | SPC | (ア゜アカイ ホン) ヲ クダ"サイ. |
| 6 | キ | (アノ キ- ホン ヲ クダ"サイ. |
| 7 | イ | (アノ キイ² ホン) ヲ クダ"サイ. |
| 8 | ロ | (アノ キイロ² ホン) ヲ クダ"サイ. |
| 9 | イ | (アノ キイロイ² ホン) ヲ クダ"サイ. |
| 10 | SPC | (アノ キイロイ ホン) ヲ クダ"サイ. |
| 11 | SPC | (アノ キイロイ ホン) ヲ クテ"サイ. |
| 12 | SPC | (アノ キイロイ ホン) ヲ クダ"サイ. |
| 13 | TRL | GIVE ME (THAT YELLOW BOOK). |

The modified mother language (Japanese) sentence:
"(アノ キイロイ ホン) ヲ クダ " サイ." which is to read "GIVE ME (THAT YELLOW BOOK)." in English is not stored in the memory.

The second Japanese sentence can be translated to English according to the operation described in Table 1 where the cursor can pass the data in a letter unit and a letter which can be passed is identified by being turned on and off as directed by a very small circle "°". The cursor is placed at such a letter.

Step 1: The "SN/WD" key 150 is actuated, and one of the category keys 160 is actuated. The flag $F_3$ is set in response to actuation of the "SN/WD" key 150. As the flag $F_3$ is set, one of the category keys 160 is selected to develop the first mother language sentence, which is applied to the sentence buffer SB. The flags $F_1$ and $F_3$ are reset and the flag $F_2$ is set.

Step 2: The control circuit locates the opening half "(" of the parentheses for containing the one or more changeable words. The head letter of the leading word in the parentheses is turned on and off by applying the position into the cursor pointer CU. Then, the head letter of the changeable word is turned on and off, automatically.

Step 3: The space key 120 is actuated to reset the flag $F_2$ and enter the letter "ア" at the cursor position into the word buffer WB. The cursor is forwarded to the next letter.

Step 4: The space key 120 is actuated to enter the second letter into the word buffer WB, so that the cursor is forwarded. As the next code following the second letter is blank, the flag $F_1$ is set so that the data after the cursor position is right shifted by one letter. Then, the word "アノ" is entered into the word buffer WB.

Step 5: The space key 120 is actuated and the word ROM is searched so as to find out a word corresponding to the word "アノ" contained in the word buffer WB. The serial number of the thus detected word is applied to the first serial number buffer $NB_1$. The data following the cursor position is left shifted by one letter. The cursor is placed at the next letter. The flag $F_1$ is reset and the flag $F_2$ is set. Then, the cursor is at the head letter of the second changeable word.

The reason for indicating the cursor position by switching on and off the data after the word "アノ" is that it may be possible to add any letter into this position. The reason for the right shifting by one letter is to provide a spacing between the switching cursor position and the following word.

Step 6: The key 130 for entering the letter "キ" is actuated and the word "アカイ" before the next blank is deleted as the flag $F_2$ is set. The flag $F_2$ is reset. The letter "キ" is entered into the cursor position of the sentence buffer SB and the word buffer WB. The cursor is sent to the next letter. The data after the cursor position are right shifted, the flag $F_1$ is set.

Steps 7 to 9: After the key 130 other letter keys are actuated to enter each of the letters "イ", "ロ" and "イ", the word buffer WB receives the word "キイロイ".

Step 10: The space key 120 is actuated to search the word ROM to locate a word corresponding to the word "キイロイ" contained in the word buffer WB. The serial number of the thus-derived word is entered into the second serial number buffer $NB_2$. The data after the cursor position is left shifted by one letter. The cursor is forwarded to the next letter. The flag $F_1$ is reset and the flag $F_2$ is set. The cursor is placed at the head of the third changeable word.

Steps 11 and 12: The space key is actuated twice to enter the word "ホン" into the word buffer WB in the same manner as in the case of the word "アノ" into the word buffer WB.

Step 13: Lastly, the translation key 110 is actuated to search the word ROM to find a word corresponding to the last-entered word "ホン" into the word buffer WB. The serial number of this word is applied to the 3rd serial number buffer $NB_3$. The word ROM develops a foreign language sentence having the same serial number as and corresponding to the mother language sentence as it was retrieved from the ROM. The word ROM further develops foreign words corresponding to the serial numbers stored in the serial number buffers $NB_1$, $NB_2$ and $NB_3$. These foreign words are used to replace the changeable words in the foreign language sentence so that the translation of the modified second mother language sentence is obtained to read "GIVE ME (THAT YELLOW BOOK).". When the translation key 110 is actuated, the translation is carried out regardless of the cursor position.

EXAMPLE 2

This example is featured in that the cursor can pass the data in a word unit.

TABLE 2

| Step | Key Operation | Display |
|---|---|---|
| 1 | SN/WD and one category key | (アノ アカイ ホン) ヲ クダ"サイ. |
| 2 | | (アﾟ アカイ ホン) ヲ クダ"サイ. |
| 3 | SPC | (アノ アカイ ホン) ヲ クダ"サイ. |
| 4 | キ | (アノ キ° ホン) ヲ クダ"サイ. |
| 5 | イ | (アノ キイ° ホン) ヲ クダ"サイ. |
| 6 | ロ | (アノ キイロ° ホン) ヲ クダ"サイ. |
| 7 | イ | (アノ キイロイ° ホン) ヲ クダ"サイ. |
| 8 | TRL | GIVE ME (THAT YELLOW BOOK). |

Steps 1 and 2: These steps are executed by actuating the sentence/word key 150 and one of the category keys 160 to access the first mother language sentence. The first changeable word "アノ" is switched on and off, automatically.

Step 3: The space key 120 is actuated to switch on and off the second changeable word "アカイ".

Step 4: The letter key 130 for the letter "キ" is actuated to delete the word "アカイ" and to indicate the letter "キ".

Steps 5 to 7: The respective letter keys are actuated to enter "イ", "ロ" and "イ".

Step 8: The translation key 110 is actuated to effect translation.

EXAMPLE 3

Based on the first mother language sentence, a third mother language sentence, "(アノ ホン) ヲ クダ"サイ." is re-formed to read "GIVE ME (THAT BOOK)." in English.

TABLE 3

| Step | Key Operation | Display |
|---|---|---|
| 1 | SN/WD and one category key | (アノ アカイ ホン) ヲ クダ"サイ. |
| 2 | | (アﾟ アカイ ホン) ヲ クダ"サイ. |
| 3 | SPC | (アノ アカイ° ホン) ヲ クダ"サイ. |
| 4 | DEL | (アノ° ホン) ヲ クダ"サイ. |
| 5 | TRL | GIVE ME (THAT BOOK). |

The delete key 140 is actuated in place of the operation of the key switches 130 in this example.

Steps 1 to 3 follows those of example 2. In step 4, the delete key 140 is actuated to delete all the letters, "アカイ", from the cursor position to the following blank or the closing half of the parentheses. Lastly, the translation key 110 is actuated to obtain a translation of "GIVE ME (THAT BOOK).".

In examples 2 and 3, the operation of passing a word unit is enabled by detecting the blank position in the changeable terms in the mother sentence read into the sentence buffer SB to find out the word positions and the number of letters. The respective changeable words in the sentence buffer SB are retrieved from the word ROM in response to actuation of the translation key 110 so that the serial numbers of these words are detected. The translation can be held regardless of the cursor position.

EXAMPLE 4

This example is different from example 1 in that, when the cursor is placed at the head letter of a word, actuation of the letter key 130 does not delete the word.

A fourth mother language sentence "(פ׳ פ×ו ×ט) ג גפ" טי." reading in English "GIVE ME (THAT BLUE BOOK).", may be obtained from the first mother language sentence.

TABLE 4

| Step | Key Operation | Display |
|---|---|---|
| 1 | SN/WD and one category key | (פ׳ פ×ו ×ט) ג גפ"טי. |
| 2 | | (פ׳ פ×ו ×ט) ג גפ"טי. |
| 3 | SPC | (פ׳ פ×ו ×ט) ג גפ"טי. |
| 4 | SPC | (פ׳ פ×ו ×ט) ג גפ"טי. |
| 5 | SPC | (פ׳ פ×ו ×ט) ג גפ"טי. |
| 6 | פ | (פ׳ פ×ו ×ט) ג גפ"טי. |
| 7 | ג | (פ׳ פ×ו ×ט) ג גפ"טי. |
| 8 | TRL | GIVE ME (THAT BLUE BOOK). |

Steps 1 to 5 of example 4 follow those of example 1, so that the cursor is placed at the head letter of the second changeable word. Steps 6 and 7 operate to enter the letters by actuating each of the letter keys 130. Lastly, the translation key 110 is actuated to obtain and display the translated sentence.

The cursor can be moved left although the above examples uses a right shift of the cursor. An additional key switch can be specially provided for enabling the cursor to pass the data. The letters or words which can be passed can be specified with a cursor position indicator in the display in place of turning on and off the letters or words.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator comprising:
   first memory means for storing a plurality of sentences in a first language;
   means associated with said first memory means for retrieving a first sentence from said first memory means;
   display means associated with said retrieving means for displaying said retrieved first sentence;
   cursor means associated with said display means;
   cursor control means for controlling said cursor means for causing said cursor means to pass along said display means without altering a first portion of said first sentence and for causing said cursor means to alter a second portion of said first sentence for creating a second sentence in said first language; and
   means associated with said retrieving means and with said display means for providing a translation in a second language of said second sentence in said first language.

2. An electronic translator as in claim 1, wherein said cursor control means comprises means for controlling said cursor means for changing one or more words in said first sentence.

3. An electric translator as in claim 1, wherein said cursor control means comprises means for controlling said cursor means for changing a portion of a word in said first sentence.

4. An electronic translator as in claim 1, wherein said cursor control means comprises means for controlling said cursor means for deleting at least one word from said first sentence.

5. An electronic translator as in claim 1, wherein said means for providing a translation of said second sentence comprises means for providing a translation of said first unaltered portion of said first sentence and means for providing a translation of said altered second portion.

6. An electronic translator as in claim 1, comprising means associated with said first memory means for identifying said second portion of said first sentence, said cursor control means being operative for locating said identifying means and for positioning said cursor means thereat.

7. An electronic translator as in claim 1, wherein said cursor control means comprises replacing at least one first word in said first sentence with a second word in said first language.

8. An electronic translator as in claim 7, wherein said means for providing a translation comprises sentence translating means for providing a translation of said retrieved first sentence and word translating means for providing a translation of said second word, and means for combining said translation of said first sentence with said translation of said second word.

9. An electronic translator as in claim 8, wherein
   said sentence translating means comprises a second memory means for storing sentences in a second language equivalent to said sentences in said first language, and means associated with said second memory means and said display means for retrieving and displaying second sentences corresponding to said respective first sentences; and
   said word translation means comprises third memory means for storing third words in said second language equivalent to said second words in said first language, and means associated with said third memory means and said display means for retrieving and displaying third words corresponding to said respective second words.

10. The electronic translator of claim 1, wherein said cursor means comprises a cursor indicator provided in said display means for showing the position of said cursor means.

* * * * *